United States Patent
Yang (10) Patent No.: US 11,772,651 B2
(45) Date of Patent: Oct. 3, 2023

(54) VEHICLE AND CONTROL METHOD THEREOF

(71) Applicants: HYUNDAI MOTOR COMPANY, Seoul (KR); KIA CORPORATION, Seoul (KR)

(72) Inventor: Jeong Seog Yang, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 104 days.

(21) Appl. No.: 17/477,125

(22) Filed: Sep. 16, 2021

(65) Prior Publication Data

US 2022/0144271 A1    May 12, 2022

(30) Foreign Application Priority Data

Nov. 12, 2020 (KR) .................. 10-2020-0150986

(51) Int. Cl.
*B60W 30/16* (2020.01)

(52) U.S. Cl.
CPC ....... *B60W 30/162* (2013.01); *B60W 2420/42* (2013.01); *B60W 2520/10* (2013.01);
(Continued)

(58) Field of Classification Search
CPC .... B60W 30/14; B60W 30/143; B60W 30/16; B60W 30/162; B60W 30/18018; B60W 30/18009; B60W 40/02; B60W 40/04; B60W 40/09; B60W 40/105; B60W 2050/0002; B60W 2050/0022; B60W 2050/0025; B60W 60/0018; B60W 2540/30; B60W 2555/60;
(Continued)

(56) References Cited

U.S. PATENT DOCUMENTS 10,793,150 B2 * 10/2020 Rajendra Zanpure ................. B60W 30/0956
11,370,429 B2 * 6/2022 Shivamurthy ........ B60W 30/16
(Continued)

FOREIGN PATENT DOCUMENTS

KR      20130107425     * 10/2013
KR      20170069555 A     6/2017

OTHER PUBLICATIONS

English translation of foreign document KR 20130107425 (Year: 2013).*

*Primary Examiner* — Russell Frejd
*Assistant Examiner* — Brandon Z Willis
(74) *Attorney, Agent, or Firm* — LEMPIA SUMMERFIELD KATZ LLC (57) ABSTRACT

A vehicle includes a driving device configured to control a speed of the vehicle, a camera configured to detect a surrounding vehicle, and a controller configured to determine the speed of the vehicle. The controller also calculates an image vector variation amount of the surrounding vehicle when the speed of the vehicle is lower than a predetermined speed and calculates a safety distance between the vehicle and a preceding vehicle based on the image vector variation amount of the surrounding vehicle when the image vector variation amount of the surrounding vehicle satisfies a predetermined condition. The controller also controls the driving device to control the speed of the vehicle depending on the calculated safety distance.

16 Claims, 5 Drawing Sheets

(52) U.S. Cl.
CPC ..... *B60W 2520/12* (2013.01); *B60W 2540/30* (2013.01); *B60W 2552/10* (2020.02); *B60W 2554/4041* (2020.02); *B60W 2554/4042* (2020.02); *B60W 2554/802* (2020.02); *B60W 2555/60* (2020.02); *B60W 2720/106* (2013.01)

(58) Field of Classification Search
CPC ....... B60W 2420/403; B60W 2420/42; B60W 2520/10; B60W 2520/12; B60W 2552/10; B60W 2552/53; B60W 2554/80; B60W 2554/802; B60W 2554/4041; B60W 2554/4042; B60W 2554/4044; B60W 2554/408; B60W 2554/4046; B60W 2720/10; B60W 2720/106; B60W 2754/10; B60W 2754/30; B60Y 2300/16; B60Y 2300/162; B60Y 2300/143
See application file for complete search history.

(56) References Cited

U.S. PATENT DOCUMENTS

| | | | | |
|---|---|---|---|---|
| 2014/0121857 | A1* | 5/2014 | Lachini | B60R 25/20 701/1 |
| 2015/0334269 | A1* | 11/2015 | Yokota | G06V 20/56 382/103 |
| 2016/0107648 | A1* | 4/2016 | Carlson | B60W 10/10 477/107 |
| 2018/0162392 | A1* | 6/2018 | Takaki | G01S 13/867 |
| 2020/0079380 | A1* | 3/2020 | Yu | B60W 60/001 |
| 2021/0078584 | A1* | 3/2021 | Janampally | B60W 30/143 |
| 2022/0324444 | A1* | 10/2022 | Germain | B60W 50/0098 |

* cited by examiner

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2020-0150986, filed on Nov. 12, 2020, in the Korean Intellectual Property Office, the disclosure of which is incorporated by reference herein in its entirety.

BACKGROUND

Field

The disclosure relates to a vehicle and a control method thereof.

Description of the Related Art

An advanced smart cruise control (ASCC) actively controls a distance based on a current driving speed of a host vehicle and a driving speed of a preceding vehicle when controlling a distance to the preceding vehicle in front of the host vehicle.

However, when driving on a highway or the like, immediately before entering a congested section, the preceding vehicle may not secure a safe distance from a vehicle in front of the preceding vehicle and may suddenly brake.

In this case, even if a user's host vehicle is at a sufficient distance, a risk of collision with the preceding vehicle due to the sudden braking increases.

SUMMARY it is an aspect of the disclosure to provide a vehicle capable of determining a driving environment of a surrounding vehicle based on traffic information and controlling a distance between the vehicle and a preceding vehicle. It is another aspect of the disclosure to provide a control method thereof.

Additional aspects of the disclosure are set forth in part in the following description and additional aspects of the disclosure, in part, should be apparent from the description or may be learned by practice of the disclosure.

In accordance with an aspect of the disclosure, a vehicle includes a driving device configured to control a speed, i.e., a driving speed of the vehicle, a camera configured to detect a surrounding vehicle, and a controller. The controller is configured to: determine the speed of the vehicle; calculate an image vector variation amount of the surrounding vehicle when the speed of the vehicle is lower than a predetermined speed; calculate a safety distance between the vehicle and a preceding vehicle based on the image vector variation amount of the surrounding vehicle when the image vector variation amount of the surrounding vehicle satisfies a predetermined condition; and control the driving device to control the speed of the vehicle depending on the calculated safety distance.

The controller may be configured to check a speed limit of a road on which the vehicle is traveling and reflect a driving tendency of a driver to the speed limit of the road on which the vehicle is traveling.

The controller may be configured to compare a driving speed of the vehicle and the speed limit of the road reflecting the driving tendency of the driver. The controller may be also configured to calculate an image vector variation amount of the surrounding vehicle when it is determined that the driving speed of the vehicle is lower than the limit speed of the road on which the vehicle is traveling.

The controller may be configured to determine whether a driving speed of the vehicle is maintained for a first time period when it is determined that the driving speed of the vehicle is lower than the limit speed of the road on which the vehicle is traveling.

The controller may be configured to control a driving speed of the vehicle based on the calculated safety distance when a number or quantity of surrounding vehicles satisfying the predetermined condition is greater than or equal to a predetermined number.

When an X vector and a Y vector of the surrounding vehicle traveling in the left lane based on, i.e., relative to or to the left of a lane in which the vehicle is traveling vary in a negative direction for a second time period, the controller may be configured to determine that a speed of the surrounding vehicle is decelerating and calculate variation amounts of the X vector and the Y vector.

When an X vector and a Y vector of the surrounding vehicle traveling in the right lane based on, i.e., relative to or to the right of a lane in which the vehicle is traveling vary in a positive direction and a negative direction for a second time period, respectively, the controller may be configured to determine that a speed of the surrounding vehicle is decelerating and calculate variation amounts of the X vector and the Y vector.

In accordance with another aspect of the disclosure, a vehicle includes a driving device configured to control a speed of the vehicle, a camera configured to detect a surrounding vehicle, and a controller. The controller is configured to: determine a driving speed of the vehicle and a distance between the vehicle and a preceding vehicle; calculate an image vector variation amount of the surrounding vehicle detected by the camera; calculate a weighted value based on the image vector variation amount of the surrounding vehicle; calculate a safety distance by applying the weighted value to at least one of the driving speed of the vehicle and the distance between the vehicle and the preceding vehicle; and control the driving device to control the speed of the vehicle depending on the calculated safety distance.

The controller may be configured to determine whether the image vector variation amount satisfies a predetermined condition.

The controller may be configured to, when the image vector variation amount satisfies the predetermined condition, control the driving device to control the speed of the vehicle depending on the safety distance when a number or quantity of surrounding vehicles satisfying the predetermined condition is greater than or equal to a predetermined number.

In accordance with another aspect of the disclosure, a control method of a vehicle includes: determining a speed of the vehicle; calculating an image vector variation amount of a surrounding vehicle when the speed of the vehicle is lower than a predetermined speed; calculating a safety distance between the vehicle and a preceding vehicle based on the image vector variation amount of the surrounding vehicle when the image vector variation amount of the surrounding vehicle satisfies a predetermined condition; and controlling the speed of the vehicle depending on the calculated safety distance.

The control method may further include checking a speed limit of a road on which the vehicle is traveling and reflecting a driving tendency of a driver to the speed limit of the road on which the vehicle is traveling.

The control method may further include comparing a driving speed of the vehicle and a speed limit of the road reflecting the driving tendency of the driver. The control method may also include calculating an image vector variation amount of the surrounding vehicle when it is determined that the driving speed of the vehicle is lower than the speed limit of the road on which the vehicle is traveling.

The control method may further include comparing a driving speed of the vehicle and a speed limit of a road on which the vehicle is traveling. The control method may also include determining whether the driving speed of the vehicle is maintained for a first time period when it is determined that the driving speed of the vehicle is lower than the speed limit of the road on which the vehicle is traveling.

The control method may further include controlling the driving speed of the vehicle based on the calculated safety distance when a number or quantity of surrounding vehicles satisfying the predetermined condition is greater than or equal to a predetermined number.

The control method may further include determining that the speed of the surrounding vehicle is decelerating when an X vector and a Y vector of the surrounding vehicle traveling in the left lane relative to a lane in which the vehicle is traveling vary in a negative direction for a second time period. The control method may further include calculating variation amounts of the X vector and the Y vector.

The control method may further include determining that the speed of the surrounding vehicle is decelerating when an X vector and a Y vector of the surrounding vehicle traveling in the right lane relative to a lane in which the vehicle is traveling vary in a positive direction and a negative direction for a second time period, respectively, and calculating variation amounts of the X vector and the Y vector.

The control method may further include setting a weighted value based on the image vector variation amount of the surrounding vehicle.

The control method may further include calculating the safety distance by applying the weighted value to at least one of a driving speed of the vehicle or a distance between the vehicle and the preceding vehicle.

The control method may further include determining whether a number of surrounding vehicles satisfying a predetermined condition is greater than or equal to a predetermined number when the image vector variation amount satisfies the predetermined condition.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Like reference numerals refer to like elements throughout the specification. This specification does not describe all the elements of the embodiments and duplicative contents between general contents or embodiments in the technical field of the present disclosure have been omitted. The terms 'part,' 'module,' 'member,' and 'block' used in this specification may be embodied as software or hardware. A plurality of 'parts,' 'modules,' 'members,' and 'blocks' may be embodied as one component, or one 'part,' 'module,' 'member,' and 'block' may include a plurality of components according to embodiments.

Throughout the specification, when a part is referred to as being "connected" to another part, it includes not only a direct connection but also an indirect connection and the indirect connection includes connecting through a wireless network.

Also, when it is described that a part "includes" an element, it means that the element may further include other elements, without excluding the other elements unless specifically stated otherwise.

Throughout the specification, when a member is described as being "on" another member, this includes not only a case where one member is adjacent to the other member, but also a case where another member is placed between the two members.

The terms 'first, second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation. The identification numeral does not describe the order of the steps and each step may be performed differently from the order specified unless the context clearly states a particular order. When a component, device, element, or the like of the present disclosure is described as having a purpose or performing an operation, function, or the like, the component, device, or element should be considered herein as being "configured to" meet that purpose or to perform that operation or function.

Hereinafter the disclosure is described in detail with reference to the accompanying drawings.

Figure 1:
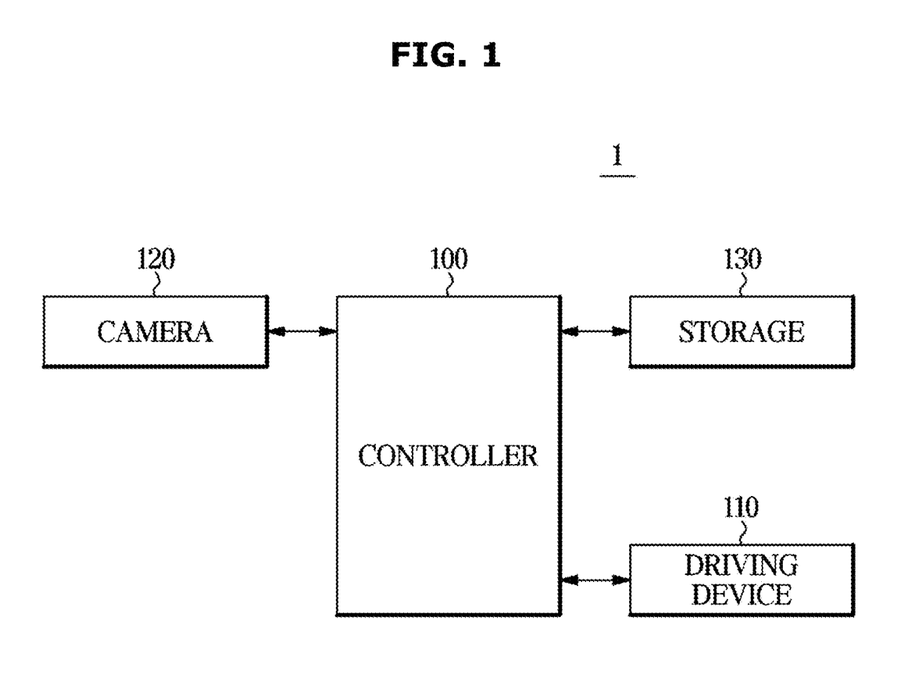
FIG. 1 is a control block diagram of a vehicle according to an embodiment of the disclosure.

FIG. 1 is a control block diagram of a vehicle according to an embodiment of the disclosure.

As illustrated in FIG. 1, a vehicle 1 may include a driving device 110 configured to control a speed of the vehicle 1, a camera 120 configured to detect a surrounding vehicle, and a controller 100. The controller 100 is configured to determine the speed of the vehicle and calculate an image vector variation amount of the surrounding vehicle when the speed of the vehicle is lower than a predetermined speed The controller is also configured to calculate a safety distance between the vehicle 1 and a preceding vehicle based on the image vector variation amount of the surrounding vehicle when the image vector variation amount of the surrounding vehicle satisfies a predetermined condition. The controller 100 is also configured to control the driving device 110 to control the speed of the vehicle 1 depending on the calculated safety distance.

When the vehicle 1 is traveling with an advanced smart cruise control (ASCC), the controller 100 may receive traffic information of a road on which the vehicle 1 is traveling and check navigation information.

The driving device 110 may receive a control signal depending on the safety distance from the controller 100.

The driving device 110 may control the speed of the vehicle 1 based on the control signal in order to maintain a distance between the vehicle 1 and the preceding vehicle traveling ahead of the vehicle 1.

The driving device 110 may receive a control signal depending on the safety distance from the controller 100 in real time and control the speed of the vehicle 1 in real time based on the control signal in order to maintain the distance between the vehicle 1 and the preceding vehicle.

The driving device 110 may be provided as a device capable of driving the vehicle 1.

In more detail, the driving device 110 may include an engine and various components for driving the engine.

The camera 120 may be attached to at least one of a front side or a rear side of the vehicle 1 to detect a surrounding vehicle and detect preceding vehicle traveling ahead of the vehicle 1.

The camera 120 may store an image of the surrounding vehicle in a storage 130.

The controller 100 may receive traffic information of a road on which the vehicle 1 is traveling through an audio video navigation (AVN) of the vehicle 1.

The controller 100 may check the driving speed of the vehicle 1.

The controller 100 may determine whether preceding vehicles are congested in a lane on which the vehicle 1 is traveling, based on at least one of the traffic information received through the AVN or the driving speed of the vehicle 1.

The controller 100 may determine whether the vehicle 1 is suddenly stopped depending on whether preceding vehicles are congested in a lane on which the vehicle 1 is traveling.

The controller 100 may determine the number of vehicles on a road on which the vehicle 1 is traveling and the number of surrounding vehicles on the left and right lanes of a lane on which the vehicle 1 is traveling, using at least one of the traffic information received through the AVN or the driving speed of the vehicle 1.

The controller 100 may determine whether preceding vehicles are congested in a lane in which the vehicle 1 is traveling, based on at least one of the number of vehicles on the road on which the vehicle 1 is traveling, the number of surrounding vehicles on the left and right lanes of the lane on which the vehicle 1 is traveling, the traffic information, or the driving speed of the vehicle 1.

For example, the controller 100 may compare the driving speed of the vehicle 1 and a predetermined speed in order to determine whether preceding vehicles are congested in a lane in which the vehicle 1 is traveling and may determine that the preceding vehicles are congested in the lane in which the vehicle 1 is traveling when the speed of the vehicle 1 is lower than the predetermined speed.

The predetermined speed may be a speed limit of a road on which the vehicle 1 is traveling.

In more detail, the controller 100 may compare the driving speed of the vehicle 1 and the speed limit of the road on which the vehicle 1 is traveling. In this case, the controller 100 may reflect a driving tendency of a driver in the speed limit and compare the driving speed of the vehicle 1 and the speed limit reflecting the driving tendency of the driver. The driving tendency of the driver may be automatically updated.

For example, the driving tendency of the driver may be digitized, for example, such as 0.7 to 0.9, and may be reflected by multiplying the speed limit by the digitized driving tendency of the driver.

When the driving speed of the vehicle 1 is higher than the speed limit reflecting the driving tendency of the driver, the vehicle 1 may receive the traffic information again through the AVN and check the driving speed of the vehicle 1 again.

When the driving speed of the vehicle 1 is lower than the speed limit reflecting the driving tendency of the driver, the controller 100 may determine whether the driving speed of the vehicle 1 is maintained at a speed lower than the speed limit for a first time period.

When the driving speed of the vehicle 1 is maintained at a speed lower than the speed limit for the first time period, the controller 100 may determine that the preceding vehicles are congested in the lane in which the vehicle 1 is traveling.

When it is determined that preceding vehicles are congested in the lane in which the vehicle 1 is traveling, the controller 100 may receive an image of the surrounding vehicle from the camera 120.

For example, when the controller 100 analyzes junction information from the traffic information received through the AVN and checks that an exit lane near the junction is congested, the controller 100 may receive an image of the surrounding vehicle traveling in the right lane of a lane in which the vehicle 1 is traveling from the camera 120.

For example, when the controller 100 analyzes junction information from the traffic information received through the AVN and checks that a joining point near the junction is congested, the controller 100 may receive an image of the surrounding vehicle traveling in the left lane of the lane in which the vehicle 1 is traveling from the camera 120.

In more detail, a first lane of the road may be preferentially congested at the joining point, and thus the controller 100 may receive an image of the surrounding vehicle traveling in the left lane of the lane in which the vehicle 1 is traveling, which is close to the first lane.

The controller 100 may calculate an image vector variation amount using the received image of the surrounding vehicle.

The controller 100 may receive one or more images of the surrounding vehicles for a second time period. When there are a plurality of the surrounding vehicles, the controller 100 may receive one or more images from each of the plurality of surrounding vehicles. The second time period may be a time period for receiving an image to calculate an image vector of the surrounding vehicle.

When an X vector and a Y vector of the surrounding vehicle traveling in the left lane based on, i.e., relative to the lane in which the vehicle 1 is traveling vary in a negative direction for the second time period, the controller 100 may determine that the speed of the surrounding vehicle is decelerating and may calculate a variation amount of the X vector and a variation amount of the Y vector of the surrounding vehicle traveling in the left lane relative to the lane in which the vehicle 1 is traveling.

When the X vector and the Y vector of the surrounding vehicle traveling in the right lane relative to the lane in which the vehicle 1 is traveling vary in a positive direction and in the negative direction for the second time period, respectively, the controller 100 may determine that the speed of the surrounding vehicle is decelerating and may calculate a variation amount of the X vector and a variation amount of the Y vector of the surrounding vehicle traveling in the right lane relative to the lane in which the vehicle 1 is traveling.

For example, the controller 100 may calculate image vector variation amounts of surrounding vehicles d1 and d2 using images of the surrounding vehicles d1 and d2 received for the second time period.

For example, the controller 100 may calculate image vector variation amounts of the surrounding vehicles with $\Delta d1=\Delta x1i+\Delta y1j$ and $\Delta d2=\Delta x2i+\Delta y2j$. Herein, d1 may be one vehicle among the surrounding vehicles traveling in a lane next to the vehicle 1, and d2 may be a vehicle following the one vehicle. Also, $\Delta x1i$ may refer to the variation amount of the X vector of d1, $\Delta y1j$ may refer to the variation amount of the Y vector of d1, $\Delta x2i$ may refer to the variation amount of the X vector of d2, and $\Delta y2j$ may refer to the variation amount of the Y vector of d2.

The controller 100 may calculate the image vector variation amounts of the two surrounding vehicles d1 and d2 but may also calculate the image vector variation amounts of the plurality of surrounding vehicles.

The controller 100 may determine whether the image vector variation amount of the surrounding vehicle satisfies the predetermined condition.

When it is determined that the image vector variation amount of the surrounding vehicle satisfies the predetermined condition, the controller 100 may determine whether the number of surrounding vehicles satisfying the predetermined condition is greater than or equal to a predetermined number. In this case, the predetermined condition may be a condition for determining whether the surrounding vehicle is congested as it is calculated as a decrease in the image vector variation amount of the surrounding vehicle.

When it is determined that the number of surrounding vehicles satisfying the predetermined condition is greater than or equal to the predetermined number, the controller 100 may calculate a safety distance between the vehicle 1 and the surrounding vehicles. In this case, the predetermined number is not particularly limited.

The controller 100 may set a weighted value based on the image vector variation amount of the surrounding vehicle.

The controller 100 may calculate a distance between the vehicle 1 and the preceding vehicle based on at least one of the location information of the vehicle 1, the location information of the surrounding vehicle, or the image vector variation amount of the surrounding vehicle.

The controller 100 may calculate a safety distance between the vehicle 1 and the preceding vehicle by applying the weighted value to the distance between the vehicle 1 and the preceding vehicle. The safety distance may be a distance to be maintained to prevent a collision between the vehicle 1 and the preceding vehicle.

The controller 100 may control the driving device 110 to control the speed of the vehicle 1 depending on the calculated safety distance.

For example, the controller 100 may control the speed of the vehicle 1 depending on the calculated safety distance through at least one of an electronic control unit (ECU), a transmission control unit (TCU), or an electronic stability control (ESC) of the vehicle 1.

By controlling the speed of the vehicle 1, the possibility of a collision between the vehicle 1 and the preceding vehicle may be reduced.

An embodiment of the disclosure illustrates that the controller 100 is included in the vehicle 1, but the controller 100 may be included in the advanced smart cruise control (ASCC).

The storage 130 may be implemented as at least one of a non-volatile memory device, such as a cache, a ROM (Read Only Memory), a PROM (Programmable ROM), an EPROM (Erasable Programmable ROM), an EEPROM (Electrically Erasable Programmable ROM), and a flash memory, a volatile memory device, such as a RAM (Random Access Memory), or a storage medium, such as an HDD (hard disk drive) and a CD-ROM, but the storage 130 is not limited thereto.

The storage 130 may be a memory implemented as a separate chip from a processor related to the controller 100 or may be implemented as a single chip together with the processor.

Figure 2:
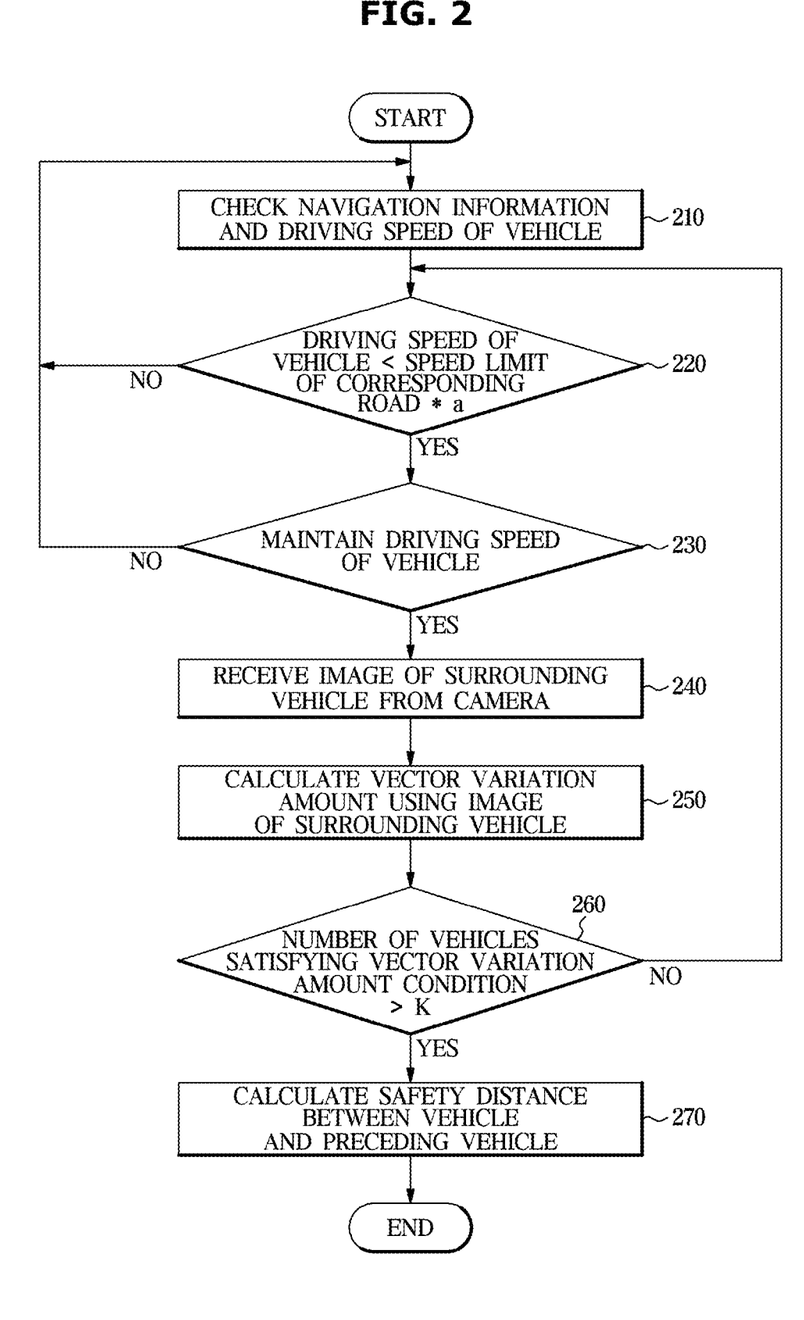
FIG. 2 is a flowchart of a control method of the vehicle according to an embodiment of the disclosure.

FIG. 2 is a flowchart of a control method of the vehicle according to an embodiment of the present disclosure.

Referring to FIG. 2, the vehicle 1 may receive traffic information of a road on which the vehicle 1 is traveling through the AVN of the vehicle 1. Also, the vehicle 1 may check the driving speed of the vehicle 1 (210).

The vehicle 1 may compare the driving speed of the vehicle 1 and a speed limit of the road on which the vehicle 1 is traveling (220).

In this case, the vehicle 1 may reflect a driving tendency a of a driver in the speed limit and compare the driving speed of the vehicle 1 and the speed limit reflecting the driving tendency a of the driver. The driving tendency a of the driver may be automatically updated.

For example, the driving tendency a of the driver may be digitized, for example, such as 0.7 to 0.9, and may be reflected by multiplying the speed limit by the digitized driving tendency of the driver.

When the driving speed of the vehicle 1 is higher than the speed limit reflecting the driving tendency of the driver, the vehicle 1 may receive the traffic information again through the AVN and check the driving speed of the vehicle 1 again (210).

When the driving speed of the vehicle 1 is lower than the speed limit reflecting the driving tendency of the driver, the vehicle 1 may determine whether the driving speed of the vehicle 1 is maintained at a speed lower than the speed limit for the first time period (230).

When the driving speed of the vehicle 1 is maintained at a speed lower than the speed limit for the first time period, the vehicle 1 may determine that the preceding vehicles are congested in the lane in which the vehicle 1 is traveling.

When it is determined that the preceding vehicles are not congested in the lane in which the vehicle 1 is traveling, the vehicle 1 may receive the traffic information again through the AVN and check the driving speed of the vehicle 1 again (210).

When it is determined that the preceding vehicles are congested in the lane in which the vehicle 1 is traveling, the vehicle 1 may receive an image of the surrounding vehicle from the camera 120 (240).

In more detail, the vehicle 1 may receive one or more images of the surrounding vehicles for the second time period.

For example, when the vehicle 1 analyzes junction information from the traffic information received through the AVN and checks that an exit lane near the junction is congested, the vehicle 1 may receive an image of the surrounding vehicle traveling in the right lane of a lane in which the vehicle 1 is traveling from the camera 120.

For example, when the vehicle 1 analyzes junction information from the traffic information received through the AVN and checks that a joining point near the junction is congested, the vehicle 1 may receive an image of the surrounding vehicle traveling in the left lane of a lane in which the vehicle 1 is traveling from the camera 120.

In more detail, the first lane of the road may be preferentially congested at the joining point, and thus the vehicle 1 may receive an image of the surrounding vehicle traveling in the left lane of the lane in which the vehicle 1 is traveling, which is close to the first lane.

The vehicle 1 may calculate an image vector variation amount using the received image of the surrounding vehicle (250).

In more detail, when the X vector and the Y vector of the surrounding vehicle traveling in the left lane relative to the lane in which the vehicle 1 is traveling vary in the negative direction for the second time period, the vehicle 1 may determine that the speed of the surrounding vehicle is decelerating and may calculate a variation amount of the X vector and a variation amount of the Y vector of the surrounding vehicle traveling in the left lane relative to the lane in which the vehicle 1 is traveling.

When the X vector and the Y vector of the surrounding vehicle traveling in the right lane relative to the lane in which the vehicle 1 is traveling vary in the positive direction and in the negative direction for the second time period, respectively, the vehicle 1 may determine that the speed of the surrounding vehicle is decelerating and may calculate a variation amount of the X vector and a variation amount of the Y vector of the surrounding vehicle traveling in the right lane relative to the lane in which the vehicle 1 is traveling.

When it is determined that the image vector variation amount of the surrounding vehicle satisfies the predetermined condition, the vehicle 1 may determine whether the number of surrounding vehicles satisfying the predetermined condition is greater than or equal to a predetermined number k (260).

When the number of surrounding vehicles satisfying the predetermined condition is less than or equal to the predetermined number k, the vehicle 1 may initialize the calculated image vector variation amount of the surrounding vehicles and may compare the driving speed of the vehicle 1 and the speed limit of the road on which the vehicle 1 is traveling again.

When the number of surrounding vehicles satisfying the predetermined condition is equal to or greater than the predetermined number k, the safety distance between the vehicle 1 and the surrounding vehicles may be calculated (270).

Figure 3:
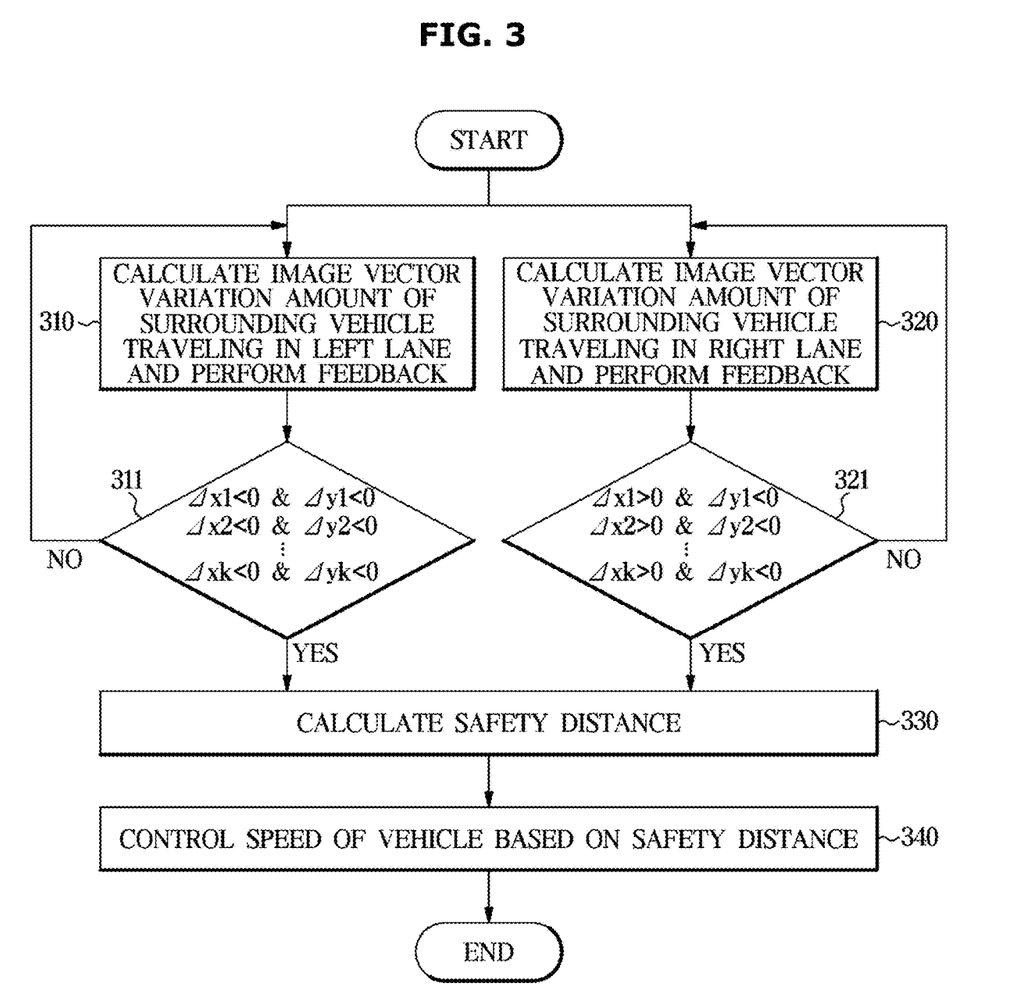
FIG. 3 is a flowchart of a control method of the vehicle according to another embodiment of the disclosure.

FIG. 3 is a flowchart of a control method of the vehicle according to another embodiment of the disclosure.

When the X vector and the Y vector of the surrounding vehicle traveling in the left lane relative to the lane in which the vehicle 1 is traveling vary in the negative direction for the second time period, the vehicle 1 may determine that the speed of the surrounding vehicle is decelerating and may calculate a variation amount of the X vector and a variation amount of the Y vector of the surrounding vehicle traveling in the left lane relative to the lane in which the vehicle 1 is traveling (310).

In more detail, the vehicle 1 may calculate the image vector variation amount of the surrounding vehicle traveling in the left lane as $\Delta x1<0, \Delta y1<0, \Delta x2<0, \Delta y2<0 \ldots \Delta xk<0$, and $\Delta yk<0$ and determine whether the X vector and the Y vector of the surrounding vehicle traveling in the left lane vary in the negative direction for the second time period (311).

Herein, $\Delta x1$ may refer to the X vector variation amount of the surrounding vehicle d1, and $\Delta y1$ may refer to the Y vector variation amount of the surrounding vehicle d1. Also, $\Delta x2$ may refer to the X vector variation amount of the surrounding vehicle d2, and $\Delta y2$ may refer to the Y vector variation amount of the surrounding vehicle d2.

Like the calculated image vector variation amount, when the X vector and the Y vector of the surrounding vehicle traveling in the left lane vary in the negative direction for the second time period, the vehicle 1 may determine that the image vector variation amount satisfies the predetermined condition and calculate a safety distance between the vehicle 1 and the preceding vehicle of the vehicle 1 (330).

Like the calculated image vector variation amount, when the X vector and Y vector of the surrounding vehicle traveling in the left lane do not vary in the negative direction for the second time period, the vehicle 1 may determine that the image vector variation amount does not satisfy the predetermined condition and perform feedback to 310.

When the X vector and the Y vector of the surrounding vehicle traveling in the right lane relative to the lane in which the vehicle 1 is traveling vary in the positive direction and in the negative direction for the second time period, respectively, the vehicle 1 may determine that the speed of the surrounding vehicle is decelerating and may calculate a variation amount of the X vector and a variation amount of the Y vector of the surrounding vehicle traveling in the right lane relative to the lane in which the vehicle 1 is traveling (320).

In more detail, the vehicle 1 may calculate the image vector variation amount of the surrounding vehicle traveling in the left lane as $\Delta x1>0, \Delta y1<0, \Delta x2>0, \Delta y2<0 \ldots \Delta xk>0$, and $\Delta yk<0$ and determine whether the X vector and the Y vector of the surrounding vehicle traveling in the right lane vary in the positive direction and in the negative direction for the second time period, respectively (321).

Herein, $\Delta x1$ may refer to the X vector variation amount of the surrounding vehicle d1, and $\Delta y1$ may refer to the Y vector variation amount of the surrounding vehicle d1. Also, $\Delta x2$ may refer to the X vector variation amount of the surrounding vehicle d2, and $\Delta y2$ may refer to the Y vector variation amount of the surrounding vehicle d2.

Like the calculated image vector variation amount, when the X vector and the Y vector of the surrounding vehicle traveling in the right lane vary in the positive direction and in the negative direction for the second time period, respectively, the vehicle 1 may calculate a safety distance between the vehicle 1 and the preceding vehicle of the vehicle 1 (330).

Like the calculated image vector variation amount, when the X vector of the surrounding vehicle traveling in the left lane varies in the positive direction for the second time period and the Y vector varies in the negative direction for the second time period, the vehicle 1 may determine that the image vector variation amount does not satisfy the predetermined condition and perform feedback to 320.

The vehicle 1 may control the speed of the vehicle 1 based on the calculated safety distance (340).

Figure 4:
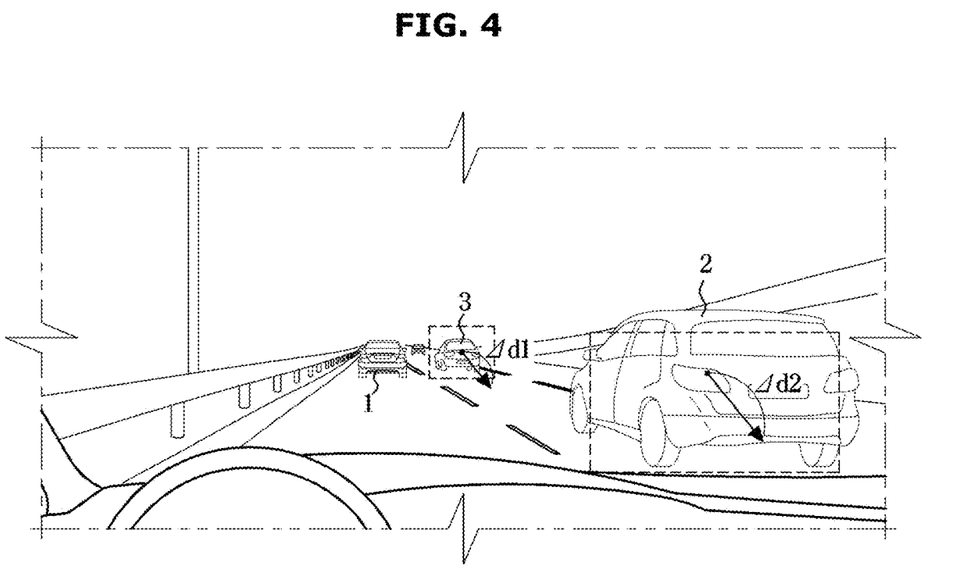
FIG. 4 is a view for explaining calculation of an image vector variation amount of the vehicle according to an embodiment of the disclosure.

FIG. 4 is a view for explaining calculation of an image vector variation amount of the vehicle according to an embodiment of the disclosure.

Referring to FIG. 4, the vehicle 1 may receive images of the surrounding vehicle 3 and the surrounding vehicle 2 in the right lane relative to the lane in which the vehicle 1 is traveling.

The vehicle 1 may calculate an image vector variation amount $\Delta d1$ corresponding to the surrounding vehicle 3 and an image vector variation amount $\Delta d2$ corresponding to the surrounding vehicle 2.

For example, the vehicle 1 may calculate image vector variation amounts of the surrounding vehicles with $\Delta d1=\Delta x1i+\Delta y1j$ and $\Delta d2=\Delta x2i+\Delta 2j$. Herein, $\Delta x1i$ may refer to the variation amount of the X vector of d1, $\Delta y1j$ may refer to the variation amount of the Y vector of d1, $\Delta x2i$ may refer to the variation amount of the X vector of d2, and $\Delta y2j$ may refer to the variation amount of the Y vector of d2.

Figure 5:
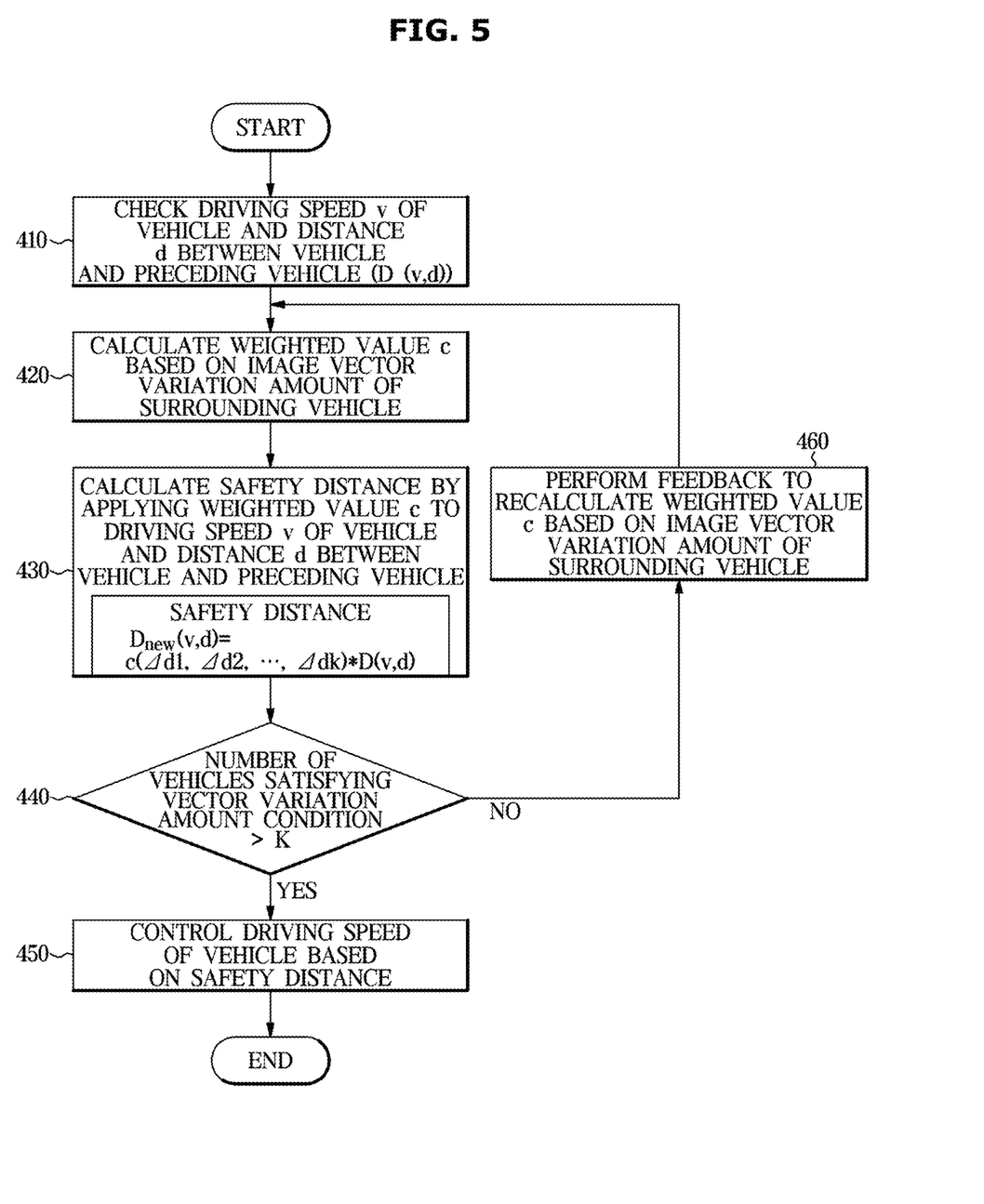
FIG. 5 is a flowchart of a control method of the vehicle according to another embodiment of the disclosure.

FIG. 5 is a flowchart of a control method of the vehicle according to another embodiment of the disclosure.

The vehicle 1 may check a driving speed v of the vehicle 1 and a current distance d between the vehicle 1 and a preceding vehicle of the vehicle 1 and may calculate a safety distance D between the vehicle 1 and the preceding vehicle (D(v, d)) (410).

The vehicle 1 may calculate a weighted value c based on the image vector variation amount of the surrounding vehicle (420).

The vehicle 1 may calculate the safety distance Dnew by applying the weighted value c to the driving speed v of the vehicle 1 and the current distance d between the vehicle 1 and the preceding vehicle (430).

In more detail, the safety distance Dnew between the vehicle 1 and the preceding vehicle may be calculated by Dnew(v, d)=c($\Delta$d1, $\Delta$d2, . . . , $\Delta$dk)*D(v, d). Herein, $\Delta$d1 may be an image vector variation amount of the surrounding vehicle d1.

When it is determined that the image vector variation amount of the surrounding vehicle satisfies the predetermined condition, the vehicle 1 may determine whether the number of surrounding vehicles satisfying the predetermined condition is greater than or equal to the predetermined number k (440).

When the number of surrounding vehicles satisfying the predetermined condition is less than or equal to the predetermined number k, the vehicle 1 may perform feedback to recalculate the weighted value c based on the image vector variation amount of the surrounding vehicle (460).

When the number of surrounding vehicles satisfying the predetermined condition is more than a predetermined number k, the vehicle 1 may control the driving speed of the vehicle 1 based on the calculated safety distance Dnew (450).

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media, including a non-transitory storage medium, in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, a vehicle and a control method thereof according to an embodiment of the present disclosure can reduce the possibility of a collision between the vehicle and a preceding vehicle by automatically controlling a distance between the preceding vehicle and the vehicle in a current driving lane based on traffic information on a road on which the vehicle is traveling and a speed of a surrounding vehicle.

The embodiments disclosed with reference to the accompanying drawings have been described above. It should be understood by those having ordinary skill in the art that various changes in form and details may be made therein without departing from the spirit and scope of the disclosure as defined by the appended claims. The disclosed embodiments are illustrative and should not be construed as limiting.

What is claimed is:

1. A vehicle comprising:
a driving device configured to control a speed of the vehicle;
a camera configured to detect surrounding vehicles; and
a controller configured to
determine the speed of the vehicle,
calculate image vector variation amounts of the surrounding vehicles when the speed of the vehicle is lower than a predetermined speed,
calculate a safety distance between the vehicle and a preceding vehicle based on the image vector variation amounts of the surrounding vehicles when the image vector variation amounts of the surrounding vehicles satisfy a predetermined condition; and
control the driving device to control the speed of the vehicle depending on the calculated safety distance,
wherein the surrounding vehicles comprise a first vehicle and a second vehicle following the first vehicle.

2. The vehicle according to claim 1, wherein the controller is configured to:
check a speed limit of a road on which the vehicle is traveling; and
reflect a driving tendency of a driver to the speed limit of the road on which the vehicle is traveling.

3. The vehicle according to claim 2, wherein the controller is configured to:
compare the speed of the vehicle and the speed limit of the road reflecting the driving tendency of the driver; and
calculate the image vector variation amounts of the surrounding vehicles when it is determined that the speed of the vehicle is lower than the speed limit of the road on which the vehicle is traveling.

4. The vehicle according to claim 1, wherein
the controller is configured to determine whether the speed of the vehicle is maintained for a first time period when it is determined that the speed of the vehicle is lower than the speed limit of the road on which the vehicle is traveling.

5. The vehicle according to claim 1, wherein
the controller is configured to control the speed of the vehicle based on the calculated safety distance when a number of surrounding vehicles satisfying the predetermined condition is greater than or equal to a predetermined number.

6. A vehicle comprising:
a driving device configured to control a speed of the vehicle;
a camera configured to detect surrounding vehicles; and
a controller configured to
determine the speed of the vehicle and a distance between the vehicle and a preceding vehicle,
calculate image vector variation amounts of the surrounding vehicles detected by the camera,
calculate a weighted value based on the image vector variation amounts of the surrounding vehicles,
calculate a safety distance by applying the weighted value to at least one of the speed of the vehicle or the distance between the vehicle and the preceding vehicle, and
control the driving device to control the speed of the vehicle depending on the calculated safety distance,
wherein the surrounding vehicles comprise a first vehicle and a second vehicle following the first vehicle.

7. The vehicle according to claim 6, wherein
the controller is configured to determine whether the image vector variation amounts satisfy a predetermined condition.

8. The vehicle according to claim 7, wherein
the controller is configured to, when the image vector variation amounts satisfy the predetermined condition, control the driving device to control the speed of the vehicle depending on the safety distance when a number of surrounding vehicles satisfying the predetermined condition is greater than or equal to a predetermined number.

9. A control method of a vehicle, the control method comprising:
determining a speed of the vehicle;
calculating image vector variation amounts of surrounding vehicles when the speed of the vehicle is lower than a predetermined speed;
calculating a safety distance between the vehicle and a preceding vehicle based on the image vector variation amounts of the surrounding vehicles when the image vector variation amounts of the surrounding vehicles satisfy a predetermined condition; and
controlling the speed of the vehicle depending on the calculated safety distance,
wherein the surrounding vehicles comprise a first vehicle and a second vehicle following the first vehicle.

10. The control method according to claim 9, further comprising:
checking a speed limit of a road on which the vehicle is traveling; and
reflecting a driving tendency of a driver to the speed limit of the road on which the vehicle is traveling.

11. The control method according to claim 10, further comprising:
comparing the speed of the vehicle and a speed limit of the road reflecting the driving tendency of the driver; and
calculating the image vector variation amounts of the surrounding vehicles when it is determined that the speed of the vehicle is lower than the speed limit of the road on which the vehicle is traveling.

12. The control method according to claim 9, further comprising:
comparing the speed of the vehicle and a speed limit of a road on which the vehicle is traveling; and
determining whether the speed of the vehicle is maintained for a first time period when it is determined that the speed of the vehicle is lower than the speed limit of the road on which the vehicle is traveling.

13. The control method according to claim 9, further comprising:
controlling the speed of the vehicle based on the calculated safety distance when a number of surrounding vehicles satisfying the predetermined condition is greater than or equal to a predetermined number.

14. The control method according to claim 9, further comprising:
setting a weighted value based on the image vector variation amounts of the surrounding vehicles.

15. The control method according to claim 14, further comprising:
calculating the safety distance by applying the weighted value to at least one of the speed of the vehicle or a distance between the vehicle and the preceding vehicle.

16. The control method according to claim 9, further comprising:
determining whether a number of surrounding vehicles satisfying a predetermined condition is greater than or equal to a predetermined number when the image vector variation amounts satisfy the predetermined condition.

* * * * *